Nov. 12, 1957 F. TIRANTI 2,812,698
CAMERA
Filed July 15, 1954 4 Sheets-Sheet 1

Nov. 12, 1957  F. TIRANTI  2,812,698
CAMERA
Filed July 15, 1954  4 Sheets-Sheet 3

United States Patent Office 2,812,698
Patented Nov. 12, 1957

2,812,698
CAMERA

Flaminio Tiranti, Rome, Italy

Application July 15, 1954, Serial No. 443,575

2 Claims. (Cl. 95—11)

This invention relates to cameras, and more particularly to cameras which are particularly suitable for reporters.

An object of this invention is to provide a camera with two photographic or working lenses and two viewing lenses.

In picture taking services for newspapers, magazines, and the like, the need arises both for ordinary picture taking and for wide-angle picture taking. Other requirements relate to the ease and rapidity of adjusting the focusing and framing in both instances and it is of the utmost importance to prevent undesired releases of the shutter such as may take place when the cover of the plate or film carrier has not been removed. In addition, the provision of a direct-vision view-finder is desirable, if not necessary, for a direct-vision framing, either in connection with the ordinary working lens or in connection with the wide-angle working lens. Other requirements relate to the strength, convenience, and easy control of the camera.

A camera according to this invention fulfils all the above requirements as it comprises:

(1) An ordinary photographic or working lens and a wide-angle photographic or working lens, either of which can be brought to operating position at will by means of a very simple operation;

(2) A viewing lens associated with the ordinary working or photographic lens, and a viewing lens associated with the wide-angle working or photographic lens, the suitable one of which is brought to the operating position at the same time as the corresponding working lens; the viewing lens which is in the operating position gives on a ground glass screen an image exactly corresponding to the image which will result on the light sensitive material as to focusing and framing inasmuch as a device is provided for parallax correction, which is operative with either working lens in any focusing adjustment thereof.

(3) A mechanical device is provided which prevents the shutter from being released when the cover of the plate or film carrier is in place.

(4) A direct-vision view-finder is provided with two framings, one for each working lens.

(5) The camera has two handles, one on each side, and double control both for focusing and for releasing the shutter, as well as two holders for flash-bulbs.

A camera according to the invention will be described with reference to the accompanying drawings which show a preferred embodiment thereof, it being understood that the specification and drawings are not to be construed in an exclusive or limiting sense.

Figure 1:
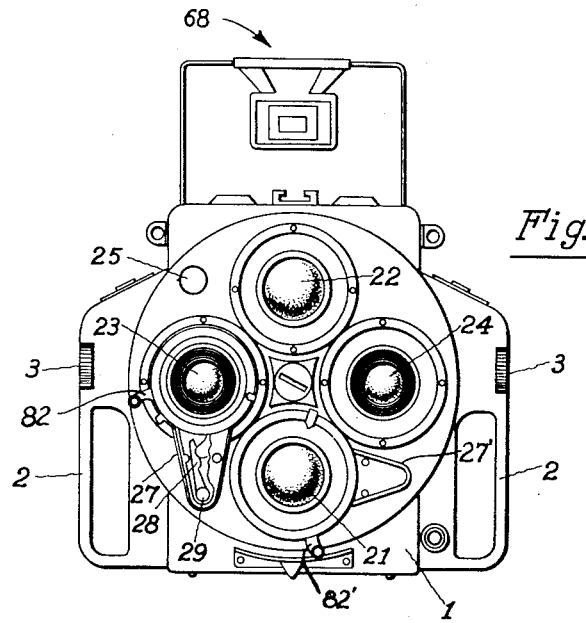
Fig. 1 is a front view of the camera.

To the sides of the casing of the camera, generally designated by 1, two symmetrical structures are fastened which comprise the handles 2, 2, and above the handles the focusing rollers 3, 3, the two shutter release buttons 4, 4, and the switches 5, 5 for two flash-bulbs are arranged. Said disposition of the two handles and double controls is very useful for the service for which the camera is particularly intended, as will be easily understood by those skilled in the art.

The casing 1 internally comprises two chambers, the lower one 6 being the photographic camera proper, and the upper one 7 serving for viewing; chamber 7 is closed at the back by a ground glass screen 8 surrounded by a shade box 9 to which a closing wall or cover 10, provided with an enlarging eye-piece 11, is hinged. Cover 10 is provided with a spring (not shown) tending to bring the cover to its open position, and with a small spring latch which can be released by hand, the latch being provided for this purpose with a portion 12 which projects from the cover.

The two chambers 6 and 7 are open in front. On the front of the camera, a turret mount 14 is arranged, said turret mount being capable of a translatory movement in a fore-and-aft direction, in which movement it is guided by a pin or rod 13, fastened to or integral with the turret mount, said pin or rod 13 being slidably received in a track formed in the wall which separates chambers 6 and 7 from each other.

Turret mount 14 has a lower opening 15 for the passage of the beam of light supplied by the working lens which is in the operating position, and an upper opening 16 for the passage of the beam of light supplied by the corresponding viewing lens. Turret mount 14 is prevented from turning by a pin 17 slidably received in a bore positioned in the casing wall.

The end of pin 13 projects from turret mount 14 and is the rotation journal for the turret 18 which carries four lens units, as will be explained hereinafter, and is retained by a screw 19 and is pressed on the turret mount by a semi-elliptical spring 20, screw 19 and spring 20 not preventing the rotation of the turret.

Turret 18 carries a normal photographic or working lens 21, which is a part of a unit comprising a shutter and a diaphragm; said unit is not described in detail here as it may be any known suitable type available on the market. Diametrically opposed to lens 21, a viewing lens 22 of the same focal length is arranged without a shutter.

90° apart from the two lenses 21 and 22, a wide-angle photographic or working lens 23 and a viewing lens 24 of equal focal lengths are arranged. Wide-angle working lens 23 is a part of a unit of any suitable type available on the market comprising a shutter and a diaphragm. Obviously, on rotating the turret through 90° either the ordinary or the wide-angle lens is brought to the operating position in front chamber 6; this rotation is obtained by depressing the spring-urged stop button 25 and turning the turret by hand; on depression of button 25, a reduced portion of the stem 26 registers with a circularly arcuate slot in turret mount 14 and may glide therein. When the other working position is reached, button 25 can return to its outward position under the action of its spring and block the turret.

The shutter of the working lens which is in the operative position is controlled by either of the two buttons 4, 4 through means which will now be briefly described, particularly with reference to the shutter associated with lens 23, those for the shutter of lens 21 being identical. In a small box 27 fastened to the casing of the lens unit, a lever 28 is arranged, rigidly connected to a spindle 29, said lever 28 being in operating contact with the release lever for the shutter.

The two spindles 29 for the shutters of the two working lenses 21 and 23 have their inner ends flattened and shaped as screwdrivers, said spindle ends travelling, during the rotatory movements of turret 18, in slot 29a in the turret mount 14.

The end of the spindle 29 associated with the lens unit, which is in the operating position, becomes engaged in the diametrical notch cut at the end of a main spindle 29b: this spindle in its movements caused by the axial movements of the turret mount travels in a guiding track 29c provided on one of the casing walls, whilst a lever 30 is permanently engaged with a longitudinal groove on spindle 29b; this lever 30 is operatively connected with both release buttons 4, 4 by means of a suitable linkage in such a way that a depression of either of said buttons will cause a rotation of said spindle 29b and consequently the rotation of spindle 29 and the release of the shutter of the lens which is in the operating position.

Rollers 3, 3, which control the movement of the turret mount 14 and turret 18 for focusing purposes, are connected for rotation by a spindle or shaft 31 which is fastened to the roller stems by screws which also prevent rollers 3, 3 from coming off. Integral with spindle 31 in the middle thereof, a little wheel 32 is provided which has slightly inclined sides, and engages by friction in a longitudinal groove 33 in the guiding pin 13 rigidly connected with the turret mount 14, so that a rotating movement of either roller 3 causes a translatory movement of the turret mount and turret, which movement serves for the focusing which is checked on the ground glass screen 8. In order to insure a sufficient frictional engagement of wheel 32 in groove 33, a strong flat spring 31a is provided, which presses spindle or shaft 31 downwards.

Another novel solution according to the invention is that which attains lightproofness between the turret mount and casing in correspondence to the photographic chamber. The lower rectangular opening 15 in the turret mount carries all around, toward the inside of the camera, a perpendicular flange 34 whose extent is greater than the longest longitudinal distance travelled by the turret mount, said flange 34 having a sliding fit in the gap formed by two frames, viz. an outer frame 35 and an inner frame 36 of corresponding shape, forming a deep furrow closed at the bottom.

Figure 2:
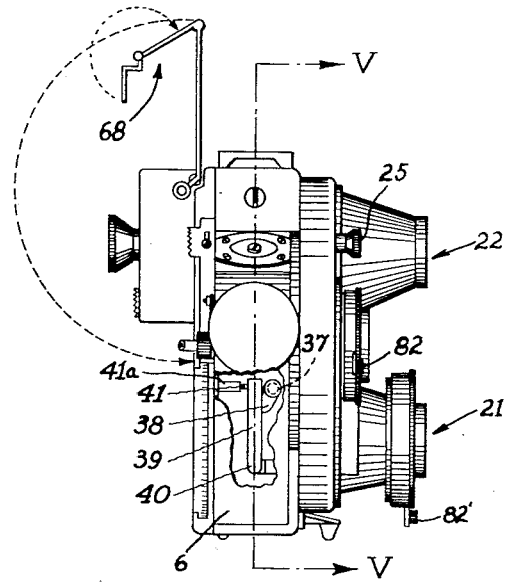
Fig. 2 is a side view, with a portion of the casing broken away.

As regards the device for preventing the shutter release when the cover of the sensitive material carrier is not removed, it comprises a spindle or shaft 37 (Fig. 5) which is a part of the means for the shutter release control already referred to without specifically mentioning said spindle and without designating it by a reference numeral; on said spindle or shaft 37 an eccentric 38 is mounted (Fig. 2), which in its idle position rests against a lever 39 pivoted at 40: against the upper end of lever 39 the inner end of a spring pin 41 rests. The turning movement of spindle or shaft 37, to which movement the release of the shutter is subservient, can take place only when eccentric 38 is able to displace lever 39 and the latter is able to push pin 41. This may happen only when the movement of pin 41 is not hindered by the presence of the cover of the plate carrying frame, or the like.

Figure 6:
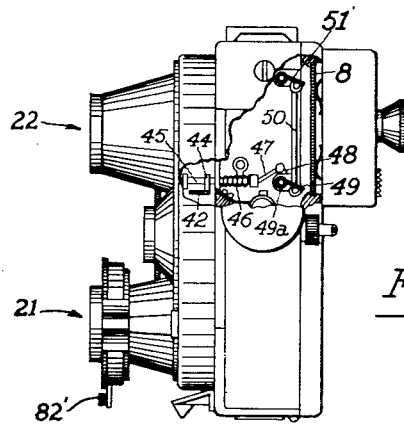
Fig. 6 is a view in side elevation on the opposite side to Fig. 2, with a portion of the casing broken away.
Figure 7:
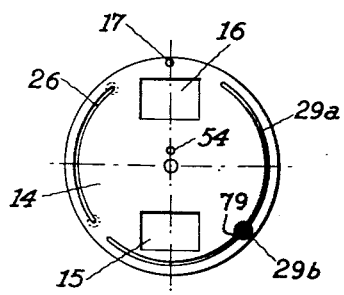
Fig. 7 is a front view of the turret mount on a smaller scale than that of the preceding figures.

The arrangement for automatic correction of parallax will now be described, starting with the instance of the ordinary photographic or working lens, reference being particularly made to Fig. 6. A horizontal lever 42 pivoted at 43 has a right-angled end portion, a front view of which is shown in Fig. 6. In the vertical branch 44 of this portion, a hole is crossed by a pin 45 provided with an adjustable head. As may be seen, a distance remains between the head of pin 45 and the branch 44 of lever 42; therefore, during the first part of the outward movement of the turret mount, pin 45 is kept by spring 46 in the position shown in the drawing, any suitable means being provided to prevent any further movement of pin 45 toward the right of Fig. 6. Nevertheless, during the outward movement of the turret from the moment that branch 44 comes into contact with the head of pin 45, the latter is forced to follow the turret against the force of spring 46, and when doing so it will move in an angular direction a blade or slat 49 pivoted at 49a, by means of the linkage 47, 48; blade or slat 49 through a link 50 will drag an upper blade or slat 51 in a parallel direction. These blades or slats 49 and 51, which extend transversely of viewing chamber 7, shield the beam of light at the top and bottom, and as their position, which depends on that of the turret, is varied, the upper and lower limits of the portion of beam that can reach the ground glass screen 8 will also be varied, the whole system being so devised that the image obtained is corrected from parallax.

Figure 8:
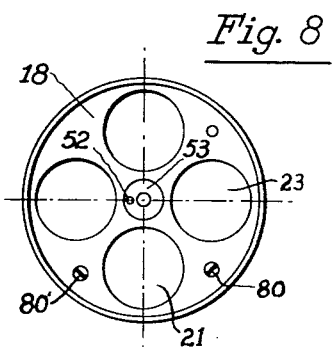
Fig. 8 is a front view of the turret on which the lenses are to be mounted, on the same scale as Fig. 7.

The head of pin 45 is at a distance from branch 44, since the turret is in the position of Fig. 8, and normal working lens 21 is in the operative position; under these circumstances even the shortest distance from which a picture can be taken corresponds to a somewhat projecting position of the turret, and the parallax correction must begin when said position is reached. If, however, the turret is rotated through 90° to bring the wide-angle lens to the operating position, the blind hole 52 in a bushing 53 on the turret will reach the vertical diameter of the turret mount; that is, it will register with a hole 54 in the turret mount, acting as a guide for a small pivot 55 (shown in Fig. 4), the other end of which will bear against a projection 56 on lever 42. In this condition, pivot 55 may be displaced and a spring 57 will cause lever 42 to turn about its pivot 43, thus bringing branch 44 into contact with the head of pin 45, even in the innermost position of the turret mount, and consequently the parallax correction will begin as early as the commencement of the outward movement of the turret mount and turret.

Moreover, the camera is provided with two discs 58 and 59 (Fig. 5) engraved with the graduations of distances in meters which correspond to the positions of the turret, one of the discs corresponding to the ordinary photographic or working lens and the other to the wide-angle working lens; a rotation in proportion to the axial distances travelled by the turret mount is imparted to the discs owing to the fact that pivot 17 guiding the turret mount has its end fastened to a depending ear 60 of a horizontal plate 61, the side edges of which are rack-toothed and are in mesh with the toothed wheels 62 and 63, respectively, which are rigidly connected with discs 58 and 59, respectively. Obviously, the two discs will turn in opposite directions, and this is taken into account in the engraving of the respective graduations. Discs 58 and 59 are under the influence of plane spiral springs 64 and 65, respectively, which tend to urge the respective discs in one direction of rotation, to prevent prejudicial effects of possible clearances between the teeth on the edges of plate 61 and the teeth of the gears connected with the discs.

Figure 3:
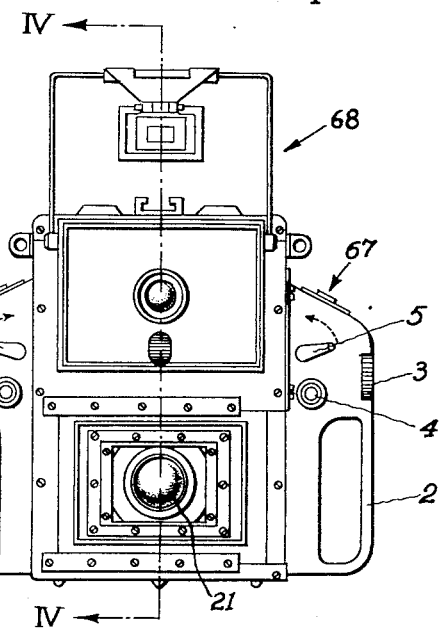
Fig. 3 is a rear view.
Figure 5:
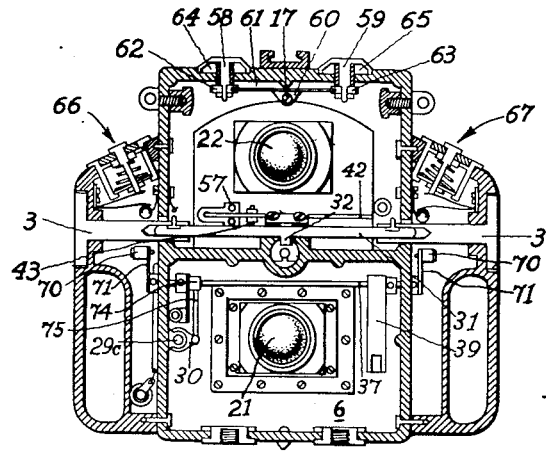
Fig. 5 is a vertical cross section.

In Fig. 5, two symmetrical holders for flash-bulbs are generally designated by 66 and 67, each of which holders may be switched on or off independently of the other on the lighting circuit by means of its own switch: the control means for the switches, shown in Fig. 3, are designated 5, 5.

Finally, a direct-vision view-finder for both working lenses, generally designated 68, completes the camera but is not described as it may be of any type known per se.

Figure 9:
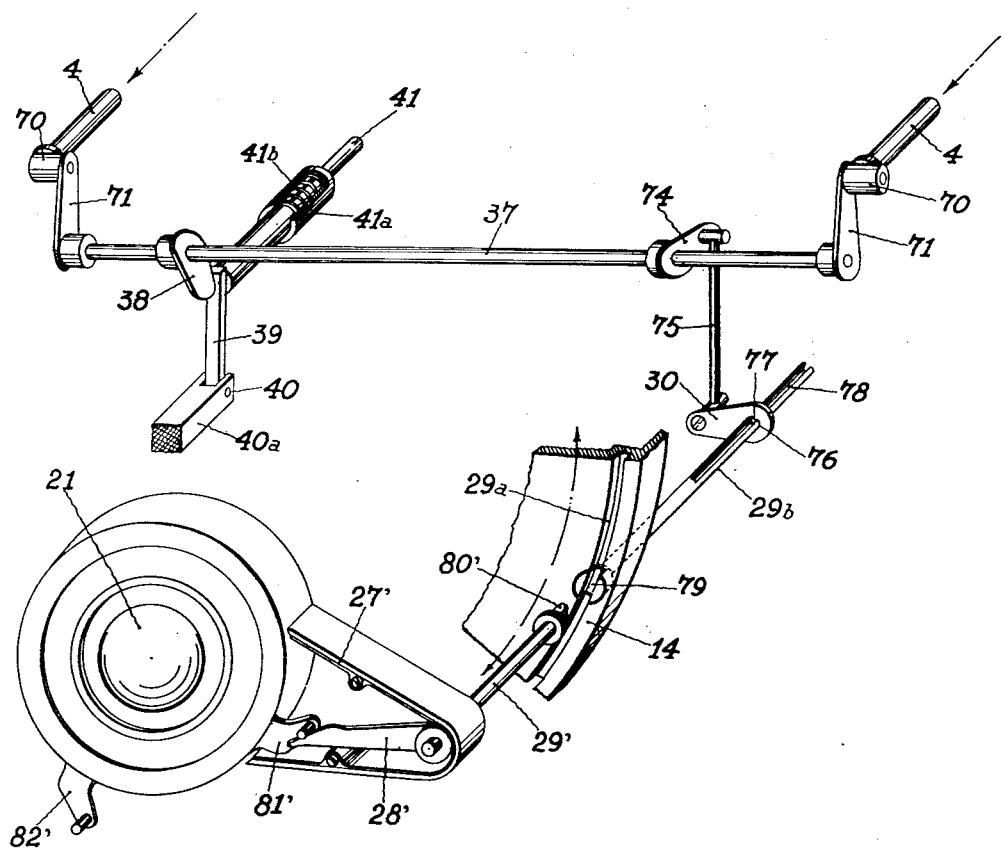
Fig. 9 is a perspective view of the shutter release device utilized in the apparatus.

Figure 9 is a perspective view of the shutter release device: in said figure, for the sake of clearness, the turret is omitted, the turret mount is shown only in part, and only one objective with its associated parts is shown: moreover two spindles which in practice are engaged with one another, are depicted somewhat spaced apart.

Referring particularly to Fig. 9, it can be seen that shutter release buttons 4, 4 which project in part from the rear wall of the camera casing, bear on rollers 70, 70 carried by levers 71, 71 fastened to shaft 37 which extends through and is rotatably supported by the side walls of the lower chamber 6 (Fig. 5) of the camera. On shaft 37 there is also fastened an eccentric 38 which bears on a lever 39 pivoted at 40 to a fixed support 40a. On the side of lever 39 opposite to eccentric 38 one end of pin 41 bears, said pin being slidably received in a bush 41a and urged to a retracted position by a spring 41b. Spring 41b acts also as a return spring for the release control device, after an operation thereof.

It will be understood that when either of shutter release buttons 4, 4 is pushed in the direction of the arrows, this causes the rotation of levers 71, 71 and eccentric 38 in a counter-clockwise direction, as viewed in Fig. 9: eccentric 38 rotates lever 39 in a clockwise direction and lever 39 pushes pin 41 outwardly against the action of spring 41b. However, if pin 41 is blocked due to the fact that the cover of the sensitive material carrier has not been removed, the rotation of cam 38 is hindered, hence the release buttons 4, 4 cannot be operated.

On shaft 37 a radially extending arm 74 is also fastened, which is connected by a link 75 to lever 30 which is pierced by a hole 76 in which a spindle 29b is slidably received, any relative rotation between spindle 29b and lever 30 being prevented by the engagement of projection 77 of the periphery of hole 76 in a longitudinal groove 78 in spindle 29b. The rotation in a counter-clockwise direction of shaft 37 and arm 74 causes a clockwise rotation of lever 30 and spindle 29b.

Figure 4:
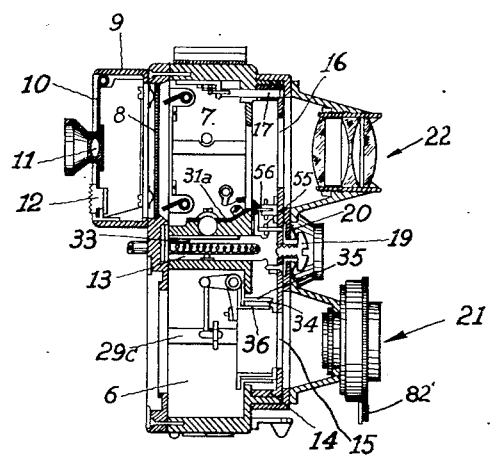
Fig. 4 is a side sectional elevation.

Spindle 29b follows the axial displacements of turret mount 14, and is guided by a guiding track 29c provided on one of the casing walls (Figures 4 and 5). The spindle terminates in a head rotatably received in a hole of turret mount 14 and provided with a diametrical slot 79 which registers with groove 29a of turret mount 14 when the shutter release device is at rest.

In the drawings, the photographic objective which is in working position is the one designated by reference numeral 21. To the mounting of objective 21 a box 27′ is fastened. A spindle 29′ which extends in a parallel direction to the rotation axis of turret 18, is rotatably supported by box 27′ and turret 18 (the turret is not shown in Fig. 9).

To the one end of spindle 29′ which is located within box 27′ a lever 28′ is fastened, and the other end 80′ of said spindle projects from the rear face of the turret plate and is flattened or shaped as a screwdriver. When turret 18 is being rotated, said screwdriverlike end 80′ of spindle 29′ travels in groove 29a in the turret mount 14.

When objective 21 is in working position, as shown in the drawings, end 80′ of spindle 29′ is received in slot 79 in the end face of spindle 29b, i. e. spindles 29′ and 29b are connected for rotation. Consequently an inward movement of either button 4 causes a rotation of lever 28′ in a clockwise direction. Lever 28′ acts on shutter release lever 81′ of objective 21, so that the exposure takes place, provided that the shutter of objective 21 is loaded. The shutter loading is effected by means of member 82′.

However, the buttons 4, 4 cannot be moved when the shutter release device is blocked by pin 41 being stopped by the cover of the sensitive material carrier.

The shutter of objective 23 is similarly operated when said objective is in working position. The loading member of said shutter (Figures 1 to 6) is designated by reference numeral 82. In Figure 1 there are shown box 27, lever 28 and spindle 29 associated with objective 23 and corresponding to box 27′, lever 28′ and spindle 29′ associated to objective 21, respectively. In Figure 11, reference numeral 80 designates the screwdriverlike end of spindle 29.

It is to be understood that whereas the arrangements forming part of the invention have been described in a very detailed manner, alterations and changes may be adopted in practice, and the different parts or combinations of parts may be replaced by operatively equivalent parts or combinations of parts without departing from the scope of the invention.

What I claim is:

1. A camera mechanism for using selectively covered light sensitive material comprising a plurality of objectives rotatable about an axis for movement into an operative position, shutters operating in conjunction with said objectives and movable therewith, shutter controls coupled to said shutters, levers for operating said shutter controls, rods coupled to said levers and capable of rotation about their axes for moving said levers to operate said shutter controls, said rods being fixedly positioned with respect to said objectives for moving therewith, a guide defining an arcuate slot for guiding said rods, push buttons for operating said shutter controls, an axle, levers coupling said axle to said push buttons for translating linear motion of said push buttons to rotational movement of said axle about its axis, an engaging rod one end of which is positioned adjacent the arcuate slot for engaging the one of the first said rods which is associated with an objective in operative position, a link for slidably coupling said engaging rod with said axle so that the rotation of said axle is imported to said engaging rod independently of the relative positions therebetween, a lug on said axle, a lever abutting said lug, a stop abutting said lever, and a spring urging said stop into contact with said lever whereby said lever is displaceably urged against said lug, said stop being adapted to contact the cover of the light sensitive material whereby said lever is indisplaceably positioned against said lug to prevent rotation of said axle.

2. A camera mechanism as claimed in claim 1 wherein said link comprises a groove in said engaging rod, a member having a tooth engaged in said groove, said member being positioned normal to the axis of said engaging rod and a linkage coupling said member to said axle.

References Cited in the file of this patent

UNITED STATES PATENTS

| 1,744,788 | Mery | Jan. 28, 1930 |
| 1,859,207 | Howell | May 17, 1932 |
| 2,408,184 | Aiken | Sept. 24, 1946 |
| 2,421,396 | Schwartz et al. | June 3, 1947 |
| 2,518,718 | Rath | Aug. 15, 1950 |
| 2,575,536 | Thompson | Nov. 20, 1951 |
| 2,693,137 | Roehrig | Nov. 2, 1954 |

FOREIGN PATENTS

| 187,716 | Switzerland | Feb. 16, 1937 |